United States Patent
Jaquinta et al.

(10) Patent No.: US 8,930,808 B2
(45) Date of Patent: Jan. 6, 2015

(54) PROCESSING RICH TEXT DATA FOR STORING AS LEGACY DATA RECORDS IN A DATA STORAGE SYSTEM

(75) Inventors: Joseph Moulton Jaquinta, Medford, MA (US); Craig Richard Wolpert, Holliston, MA (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/188,460

(22) Filed: Jul. 21, 2011

(65) Prior Publication Data

US 2013/0024765 A1    Jan. 24, 2013

(51) Int. Cl.
*G06F 17/22* (2006.01)
*G06F 7/00* (2006.01)

(52) U.S. Cl.
CPC ..... *G06F 17/2264* (2013.01); *Y10S 707/99942* (2013.01)
USPC ........... 715/242; 715/234; 715/256; 707/602; 707/999.101

(58) Field of Classification Search
USPC ......... 715/200, 205, 242, 248, 249, 256, 273, 715/234, 255; 707/602, 693, 756, 912, 917, 707/999.101
See application file for complete search history.

(56) References Cited

U.S. PATENT DOCUMENTS

| | | | |
|---|---|---|---|
| 5,532,694 A * | 7/1996 | Mayers et al. | 341/67 |
| 5,608,396 A * | 3/1997 | Cheng et al. | 341/50 |
| 5,903,230 A * | 5/1999 | Masenas | 341/51 |
| 5,911,776 A * | 6/1999 | Guck | 709/217 |
| 5,999,938 A * | 12/1999 | Bliss et al. | 1/1 |
| 6,182,092 B1 * | 1/2001 | Francis et al. | 715/227 |
| 6,381,620 B1 * | 4/2002 | Matsuura et al. | 715/203 |
| 6,400,286 B1 * | 6/2002 | Cooper | 341/51 |
| 6,470,364 B1 * | 10/2002 | Prinzing | 715/209 |
| 6,565,609 B1 * | 5/2003 | Sorge et al. | 715/234 |
| 6,850,228 B1 * | 2/2005 | Parks et al. | 345/173 |
| 7,249,318 B1 * | 7/2007 | Corell et al. | 715/209 |
| 7,373,602 B2 | 5/2008 | Trenbeath et al. | |
| 7,433,893 B2 * | 10/2008 | Lowry | 1/1 |
| 7,533,149 B2 * | 5/2009 | Starbuck et al. | 709/206 |
| 7,870,502 B2 * | 1/2011 | Rogers et al. | 715/770 |
| 7,890,852 B2 * | 2/2011 | Wason | 715/234 |
| 2002/0124019 A1 * | 9/2002 | Proulx et al. | 707/513 |
| 2004/0253568 A1 | 12/2004 | Shaver-Troup | |

(Continued)

FOREIGN PATENT DOCUMENTS

WO    2008/148275 A1    12/2008

OTHER PUBLICATIONS

Sutherland, Michael; "DOORS Rich Text—Behind the Markup", Galactic Solutions Group LLC, 2003, pp. 1-31.

(Continued)

*Primary Examiner* — Maikhanh Nguyen
(74) *Attorney, Agent, or Firm* — Sughrue Mion, PLLC

(57) ABSTRACT

A method, system and computer program product for storing rich text data that comprises identifying plain text and rich text attributes from the rich text data, wherein the rich text attributes specify richness features of the plain text, storing the plain text in a first legacy data record, and storing the rich text attributes in a second legacy data record prefixed by a token, wherein the token is recognizable by an application capable of applying the rich text attributes to the plain text to present the rich text data.

22 Claims, 7 Drawing Sheets

(56) References Cited

U.S. PATENT DOCUMENTS

| | | | |
|---|---|---|---|
| 2004/0268235 A1* | 12/2004 | Wason | 715/513 |
| 2005/0198070 A1* | 9/2005 | Lowry | 707/104.1 |
| 2006/0059184 A1* | 3/2006 | Narsude | 707/101 |
| 2006/0080590 A1* | 4/2006 | Jones et al. | 715/500 |
| 2007/0028162 A1 | 2/2007 | Griffin et al. | |
| 2008/0028296 A1 | 1/2008 | Aharoni | |
| 2008/0120539 A1 | 5/2008 | Stephens, Jr. | |
| 2009/0222718 A1 | 9/2009 | Wagner et al. | |
| 2010/0115403 A1 | 5/2010 | Sargent, III | |
| 2010/0146381 A1 | 6/2010 | Tsai et al. | |
| 2010/0268585 A1 | 10/2010 | Padveen et al. | |
| 2010/0299614 A1 | 11/2010 | Hangas et al. | |
| 2011/0055690 A1 | 3/2011 | Wason | |

OTHER PUBLICATIONS

Tsukahara et al.; "Reach: An Awareness Rich CSCL Text Chat Tool With Real-Time Key Typing Display", ICALT 7th IEEE Inter. Conf. on, Jul. 18-20, 2007, p. 655-659.

Lewis, W. D.; "ODIN: A Model for Adapting and Enriching Legacy Infrastructure", e-Science 2nd IEEE Inter. Conf. on, Dec. 2006, pp. 137-144.

Microsoft, "Rich Text Searches", IPCOM000157388D, Aug. 27, 2007, 6 pages.

* cited by examiner

PROCESSING RICH TEXT DATA FOR STORING AS LEGACY DATA RECORDS IN A DATA STORAGE SYSTEM

BACKGROUND

The invention relates generally to computer software, and more particularly, to the processing and storing of rich text data as legacy data records in a data storage system.

Large business operations often rely on legacy back-end computer systems to store data and provide common functions to different front-end systems. Furthermore, these operations may use applications that access data in the legacy back-end systems to provide continuous computing services to users when the organizations are not ready to migrate to modern data storage systems. As a result, rich text data such as those commonly found in Web based applications may continue to be stored in legacy databases and processed by legacy data-handling applications.

Legacy back end systems generally use simple data formats such as sequential records that have 80 plain characters on each record. This format originated from the days when data was entered into computers using punched cards that had the width for 80 punched characters on each card. A common feature of the legacy data storage systems is that multiple amounts of fixed width records are needed to store a quantity of text. Modern data, however, is much richer and may contain multilingual text, various fonts, styles, and colors for emphasis and expression. These data characteristics do not translate directly to plain text.

BRIEF SUMMARY

The invention provides a computer-implemented method, system and computer program product for processing rich text data that comprises identifying plain text and rich text attributes from the rich text data, wherein the rich text attributes specify richness features of the plain text, storing the plain text in a first legacy data record, and storing the rich text attributes in a second legacy data record prefixed by a token, wherein the token is recognizable by an application capable of applying the rich text attributes to the plain text to present the rich text data.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION

Embodiments of the invention relate to computer data handling. More particularly, the embodiments include a method, system, and computer program product for processing rich text data and storing plain text segments and rich text attributes of the data in legacy data records. The records containing the rich text attributes may be stored inline with the plain text records. The disclosed data storing method, system, and computer program product may be used with legacy databases and data processing applications to accommodate modern markup text formats such as HTML commonly found in Web pages and supported by current applications. The disclosed methods and systems may apply additional optimizations to the legacy data records that hold the rich text features to reduce the storage space required for the records and facilitate the interpretation and processing of the rich text attributes.

Rich text data may contain multilingual text, various fonts, styles, and colors for emphasis, expressions, and inline images. These data characteristics do not translate directly to plain text and may need to be stored in legacy data storage systems to provide the richness features of the text when an application, such as a Web browser, displays the text.

Different methods have been proposed to store rich text data in legacy computer systems such as step-aside files. These methods use step-aside files which are files that contain the rich text data that are separate from the files that contain plain text portions of the original input data. A plain text file may include plain text records with references to the richness features of the data in a step-aside file. One problem with step-aside files is that an application running in a front-end system may not have access to the step-aside files in a legacy system and thus cannot restore the data to the original rich text format. The step-aside files also need to be backed up, replicated, and distributed along with the plain text files in order to be useful. Further, all data look-ups now require two data accesses: one access to the plain text file for the plain text records and another access to the step-aside file for the richness features of the plain text. Embodiments of the invention are now described with reference to the Figures.

Figure 1:
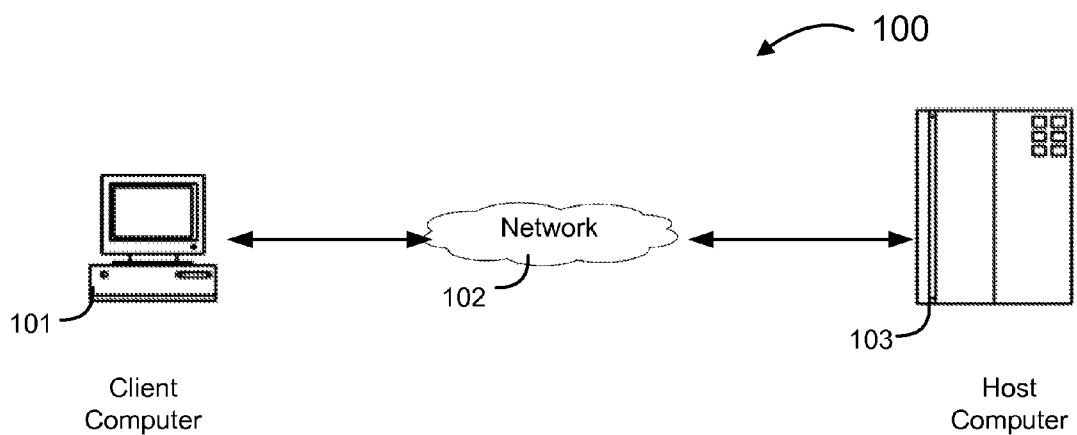
FIG. 1 is a block diagram illustrating a computing environment in which embodiments of the invention may be provided.

FIG. 1 illustrates a block diagram of a computing environment in which exemplary embodiments of the invention may be implemented. The computing environment 100 includes a client computer 101 that may be connected to a host computer 103 through network 102. As examples, client computer 101 may be a workstation or a laptop computer. A user may use the client computer 101 to access a database through host computer 103 or access the Internet through network 102 and a Web browser operating on client computer 101. Network 102 may comprise a private or public network, the Internet, or a combination thereof. Host computer 103 may be an IBM® BladeCenter® server with access to data storage systems for storing data, such as Web data downloaded by client computer 101. (IBM, and BladeCenter are trademarks of International Business Machines Corporation, registered in many jurisdictions worldwide.)

The data accessed and generated by client computer 101, for example through a Web browser, may include rich text data such as text containing different fonts, styles, sizes, colors and features for emphasis.

Computer applications that operate on host computer 103 may provide various computing services to users such as Web services, database applications, and other specific applications like financial applications. These applications may generate data that the host computer 103 stores on a data storage system accessible by the host computer 103. This data storage system may store data in a legacy data record format.

Figure 2:
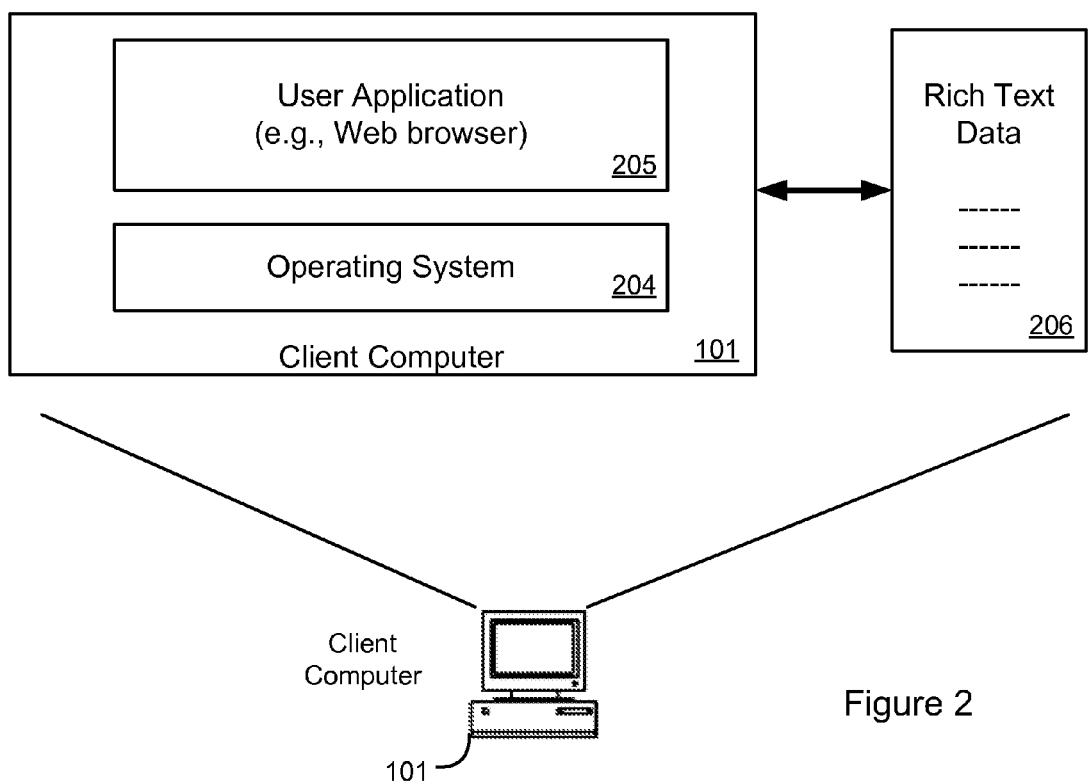
FIG. 2 is a block diagram illustrating an example user application that operates in a client computer and generates rich text data to be stored in a legacy data storage system.

FIG. 2 illustrates an example of a client computer 102 that generates rich text data for which embodiments of the invention may be used to store the rich text data in legacy data records. The operation of the client computer 101 is typically controlled by an operating system program 204 which manages the operation of components in the client computer 101, processes computer instructions, and run user applications 205 in the client computer 101. For example, one of the applications 205 may be a Web browser for accessing Web pages through the Internet. While the user is browsing the Web, the browser may access, generate, or store information that contains rich text data 206.

Figure 3:
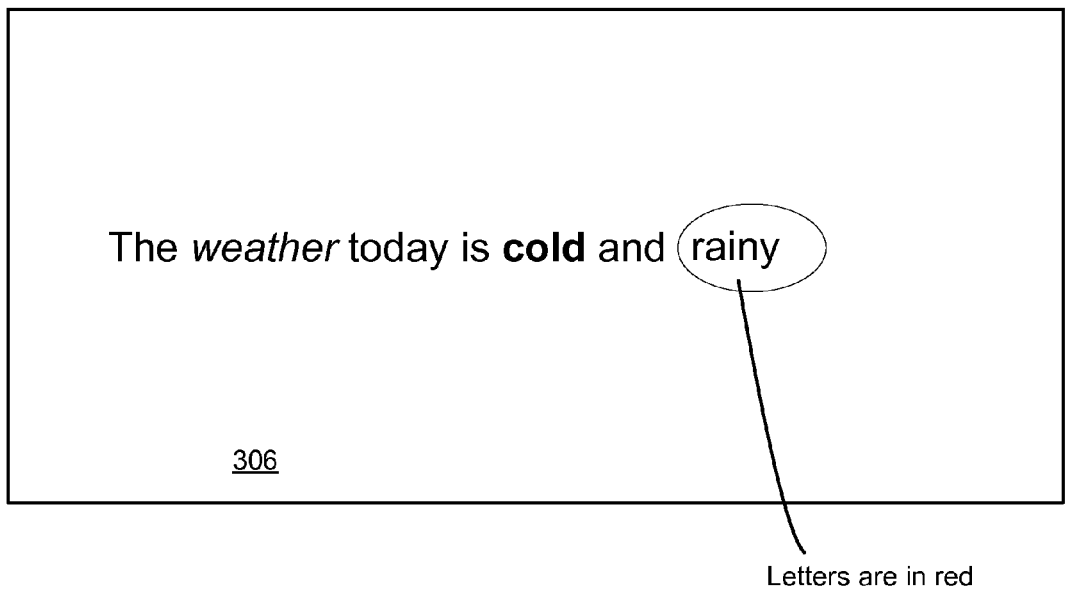
FIG. 3 is an example of rich text data that may be processed and stored in legacy data records by exemplary embodiments of the invention.

FIG. 3 is an example of the rich text data that may be processed and stored as legacy data records, according to an exemplary embodiment of the invention. The illustrated rich text data 306 may come from a Web page downloaded by a Web browser or an application operating on a portable computer-telecommunications device. The rich text data 306 may include, for example, text having different fonts, styles, sizes, colors, expressions and features for emphasis, and linked images. The rich text data 306 may need to be stored in a legacy database while preserving the full rich text features of the data for a later display.

Figure 4:
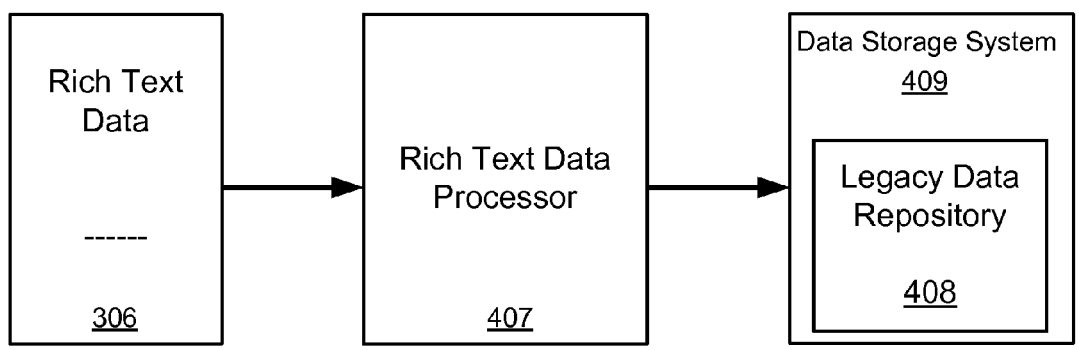
FIG. 4 is a block diagram illustrating a rich text data processor for processing rich text data and for storing plain text and rich text attributes from the data as legacy data records, according to an exemplary embodiment of the invention.

FIG. 4 is a block diagram illustrating a rich text data processor for processing rich text data and for storing plain text and rich text attributes from the data as legacy data records, according to an exemplary embodiment of the invention. In the illustrated embodiment, a rich text data processor 407 may receive rich text data 306 from a user application 205 such as a Web browser for storing the rich text data 306 in a legacy data repository 408 of a data storage system 409. The rich text data processor 407 would identify plain text and rich text portions of the data and determine rich text attributes and segments of the rich text data 306 that the attributes are applied to. The rich text data processor 407 further generates appropriate legacy data records to store both the plain text and richness attributes of the text in a legacy data repository 408.

The storing of rich text attributes in the legacy data repository 408 allows the rich text data 306 to be later presented in the original rich text format, for example, when the stored Web page is displayed to a user or provided to a modern rich text application. The legacy data repository 408 may be a legacy database that operates in the data storage system 409.

Figure 5:
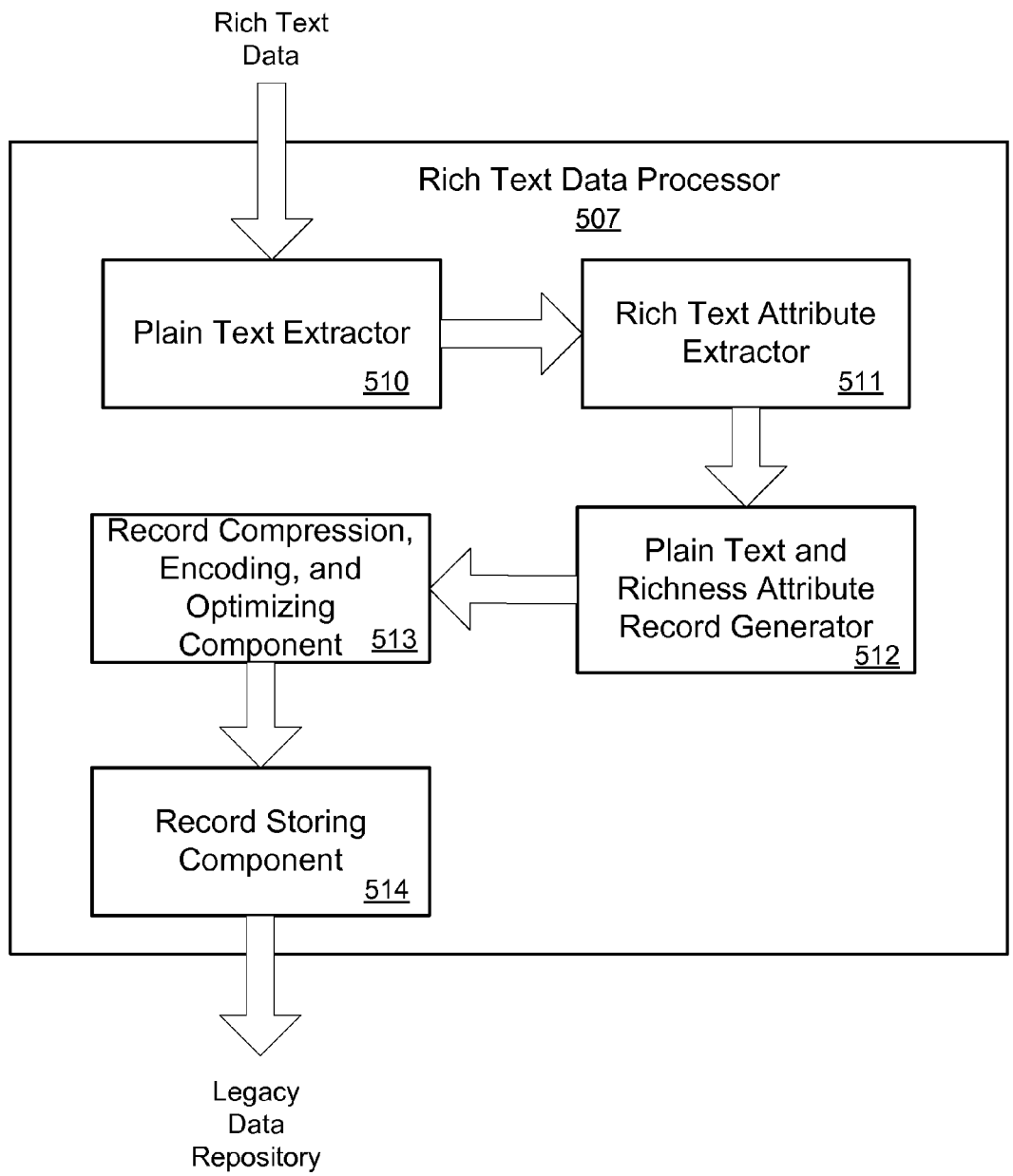
FIG. 5 is a block diagram illustrating components of a rich text data processor for identifying and extracting plain text and rich text attributes from rich text data and for storing the plain text and rich text attributes in legacy data records, according to an exemplary embodiment of the invention.

FIG. 5 illustrates a block diagram of exemplary components in a rich text data processor 507 according to an embodiment of the invention. Although the illustrated embodiment shows an example grouping of the tasks performed by the rich text data processor 507 and an example sequence of the tasks performed, alternative embodiments may include different groupings and sequences of the tasks. The rich text data processor 507 may comprise a plain text extractor 510 for identifying and extracting plain text segments in the rich text data being processed. The rich text data processor 507 may further include a rich text attribute extractor 512 for identifying rich text attributes in the input text such as the fonts used in the text, styles of parts of the text, colors in parts of the text, and other emphasis characteristics.

The plain text extractor 510 and rich text attribute extractor 512 may be implemented based on the particular encoding format of the input rich text data. For the purpose of explaining the invention, HTML data is hereby used as an example to describe the process of identifying and extracting plain text and rich text attributes from rich text data input. However, embodiments of the invention are applicable to other rich text data formats and are not limited to just HTML. HTML generally consists of segments that either comprise all plain text, or else rich text markup between the "<" and ">" symbols. For example, the HTML data specifying a paragraph in a Web page may appear as follows:

<p> This is some <b>bold</b> text. Here is a pretty picture: <img src="http://www.ibm.com/favicon.ico"/>
</p>

A simple rich text data processor 507 for HTML may scan the input text to identify and extract plain text segments and rich text segments from the input text. The rich text data processor 507 may add each segment of plain text to a plain text output stream. The rich text data processor 507 may also add each rich text segment to a rich text stream but with an indicator specifying at what point of the plain text stream the rich text segment should be inserted. In one embodiment, this marking may be achieved by adding a numeric character position after the first "<" symbol of a rich text segment. The resulting streams may appear as follows:

Plain Text Stream: This is some bold text. Here is a pretty picture: Rich Text Stream: <0p><13b><17/b><49img src="http://www.ibm.com/favicon.ico"/><49/p>

The rich text data processor 507 may then merge the plain text stream and rich text stream, and output the merged data as records. The plain text segments may be output as is and wrapped at the record limit size. The rich text segments may be output as a new record that is prefixed with a marker at the beginning of the record to indicate that it contains rich text data, but is otherwise also wrapped at the record limit size. Each of the plain text portion and rich text portion may require more than one legacy data record depending on its size and the record limit size.

Figure 8:
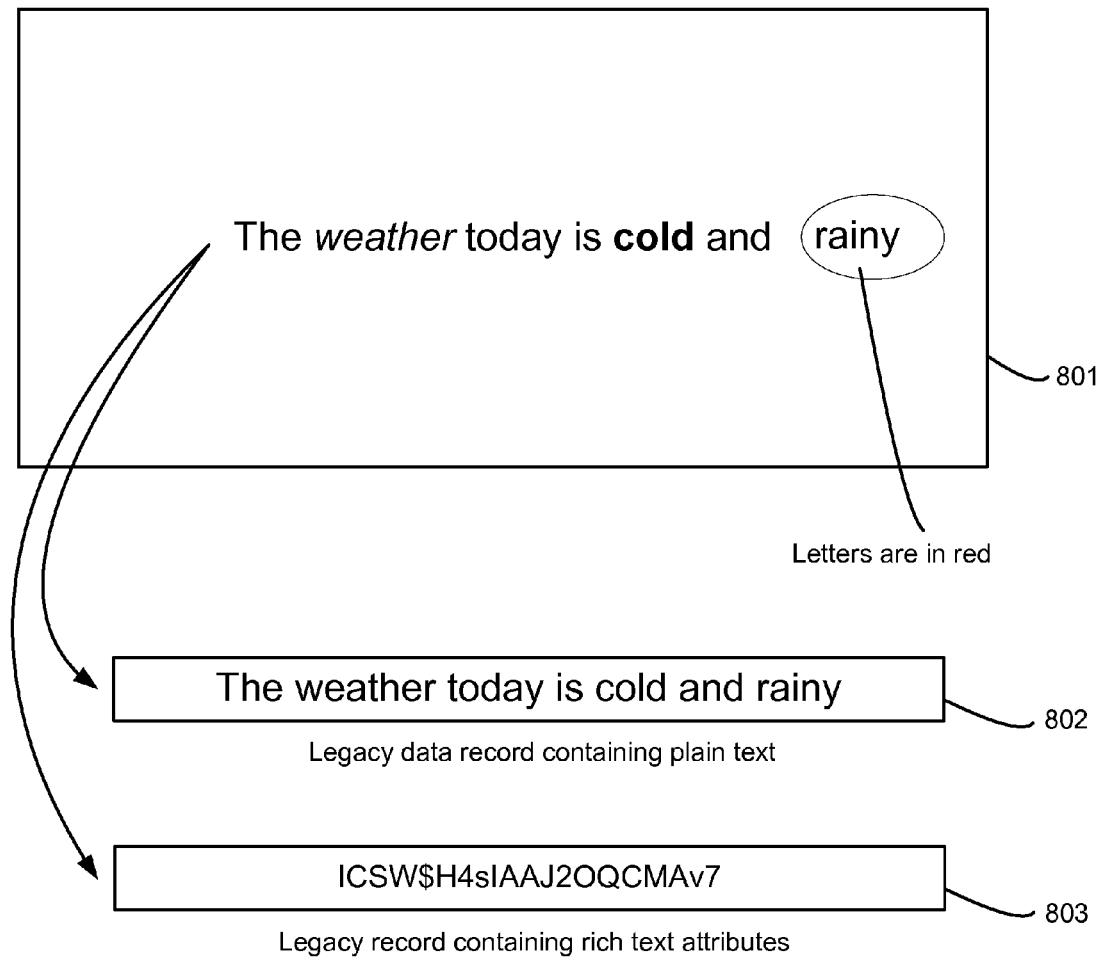
FIG. 8 illustrates an example of legacy data records generated from rich text input data by a rich text data processor for storing in a legacy data storage system, according to an embodiment of the invention.

The rich text data processor 507 may comprise a record generator 512 for generating one or more legacy data records that contain the plain text segments and one or more legacy data records that contain the rich text attributes. FIG. 8 illustrates an example of a legacy data record 802 created by the record generator 512 to contain the plain text portion of rich text data 801. The record generator 512 also generates legacy data records 803-804 that contain the rich text attributes of the rich text input data 801.

The record generator 512 may add a token to the beginning of each legacy data record that holds the rich text attributes to designate that it is an rich text attribute record. A modern computer application capable of handling rich text data would recognize such encoded and compressed attribute records based on the prefixed tokens and process the rich text attribute records accordingly. Different tokens may be used for different applications that process the tokenized legacy data records. In addition, a human being may conveniently skip over the rich text attribute records that are prefixed with the tokens when reading a file containing the legacy data records generated by the record generator 512.

For the above example, with a record limit of 32 characters and a marker in the form of "ICSW$", the records produced by the record generator 512 may appear as follows:

This is some bold text. Here is
a pretty picture:
ICSW$<0p><13b><17/b><49img src="
ICSW$http://www.ibm.com/favicon.
ICSW$ico"/><49/p>

The rich text data processor 507 may further comprise a data optimizing component 513 to perform various optimizations on the rich text attribute records to reduce their size for storage and improve their readability and processing. For example, the data optimizing component 513 may compress the legacy data records that include rich text attributes into a more compact format. In an exemplary embodiment, the data optimizing component 513 may employ an Lempel-Ziv data compression engine to compress the legacy data records containing the rich text attributes. In another embodiment, the data compression component 513 may use a Huffman coding process to compress the rich text legacy data records.

The data optimizing component 513 may initially compress the rich text legacy data records using a Lempel-Ziv compression technique which results in binary data. In order to make the compressed data records more readable to a human being, the data optimizing component 513 may employ an encoding process such as "uuencode" to convert the binary streams representing the compressed legacy data records into human-readable text. In an alternate embodiment, the data optimizing component 513 may encode the binary data into writable text characters using a binary-to-hexadecimal (BinHex) encoding process. The compressed rich text data for the above example might appear as follows:

$f*TEQKPH#jdCA0d,R0TG!"6594%8dP8)3#3

The record generator 512 may then assemble the legacy data records as before, but with the compressed data rather than the original rich text data. The resulting encoded and compressed legacy data records may then appear as:

This is some bold text. Here is
a pretty picture:
ICSW$:$f*TEQKPH#jdCA0d,R0TG!"659
ICSW$4%8dP8)3#3

Once the legacy data records containing the plain text and richness attributes of the input rich text data have been generated and optimized, a record storing component 514 in the rich text processor 507 may send these records to a legacy data storage system for storage, as illustrated in FIG. 5.

Figure 6:
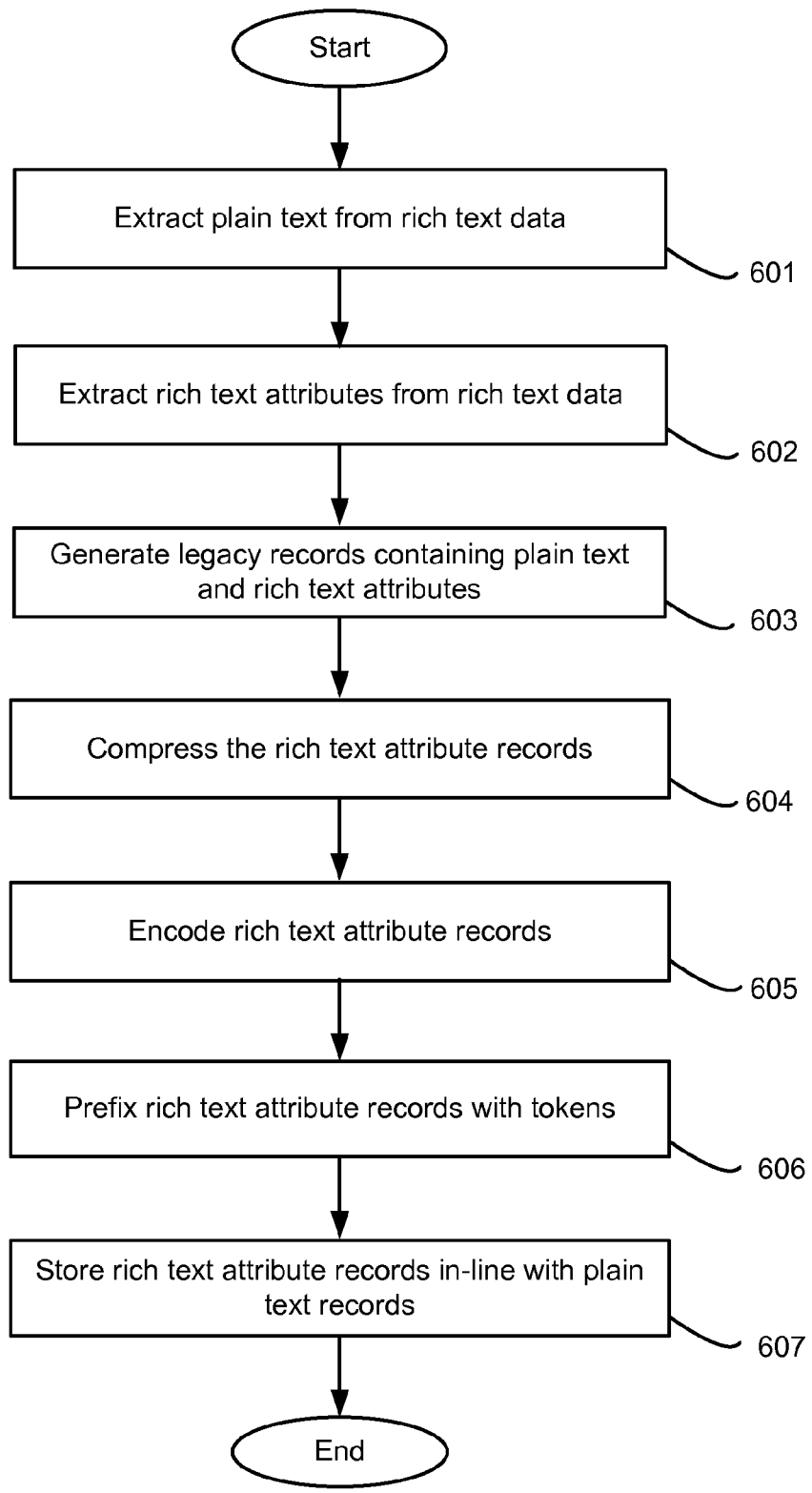
FIG. 6 is a flowchart of a process for processing rich text data and storing extracted plain text and rich text attributes of the data in a legacy data storage system, according to an exemplary embodiment of the invention.

FIG. 6 illustrates a flowchart of an exemplary process for analyzing rich text data and storing the plain text portion and rich text attributes of the rich text data as legacy data records, in accordance with an embodiment of the invention. As an example, the rich text processor 507 may perform the steps of the illustrated process on rich text data in a Web page that a user is viewing in a Web browser and wanting to store the data in the user's computer. The stored Web page may contain rich visual contents of different text fonts, styles, colors, emphasis characteristics, and linked images. This rich text data may later be archived to a legacy data storage system that can only store data in a legacy data record format.

The rich text processor 507 may begin the process at step 601 to analyze input rich text data and identify plain text segments in the input data, i.e., the text segment without any rich text attributes. For example, the plain text portion of the data may be just text in a default font, style, size, in black, and does not include any rich text attributes such as font styles and emphasis characteristics. At step 602, the rich text processor 507 may scan the input text to identify and extract the rich text attributes in the input text, such as different fonts for portions of the text, font sizes of certain text portions and their colors. The rich text processor 507 may further determine the location in the input text where each rich text attribute is applied to. The identification and extraction of plain text and rich text attributes from rich text data input may be respectively performed by the plain text extractor 510 and rich text attribute extractor 512, as described above with reference to FIG. 5.

At step 603, the rich text processor 507 may generate one or more legacy records that include the plain text portion of the input rich text data. The legacy records may be in the 80-byte record format that is common in legacy computer applications and systems. The rich text processor 507 may create additional legacy data records at step 603 to hold the rich text attributes of rich text segments in the input rich text data. The legacy data records that contain the rich text data are separate from the records holding the plain text segments. The generation of the plain text legacy data records and rich text legacy data records may be performed by the record generator 512 of the rich text processor 507, as described above with reference to FIG. 5.

In an alternate embodiment, if the richness features of the rich text data are encoded in plain text data, then the additional legacy data records are not needed. For example, if the input text is "This is some <b>bold</b> text.", then the rich text processor 507 may take use a plain text markup standard to indicate the appropriate markups in the input text. In this case, rich text processor 507 may use an asterisk "*" to indicate the bold text. It may then output the legacy records as:

Plain Text: This is some *bold* text.
Rich Text: (no record)

Since all of the richness of the input text has been encoded in the plain text, we do not need additional legacy records.

In an embodiment of the invention, the process illustrated in FIG. 6 may include further optimizations on the legacy data records at step 604. For example, the rich text processor 507 may compress the legacy records the include the rich text attributes to reduce the space required to store these records in a data storage system. In one embodiment, the rich text processor 507 may compress the legacy data records using a Lempel-Ziv data compression process. In a further optimization of the legacy data records, the rich text processor 507 may encode the compressed legacy data records to make the compressed records more readable to a person, at step 605. For example, the encoding may be based on the "uuencode" technique. The compression and optimization of the legacy data records holding the rich text data may be as described above for the data optimizing component 513 in FIG. 5.

At step 606, the rich text processor 507 may prefix each of the legacy data records that store the rich text attributes with a token to designate it as an attribute record rather than a plain text record. This token may be a unique string of characters such as the string "ICSW$". When a rich text application processes the legacy records to reconstruct the rich text data, the application will recognize the attribute records based on their prefixed tokens and extract the text richness attributes from these records. In addition, a user may conveniently skip over the tokenized attribute records when reading a file containing the legacy data records generated by embodiments of the invention.

Once the legacy data records containing the rich text attributes have been optimized, the rich text processor 507 may store the optimized legacy records inline with the legacy data records that contain the plain text portion of the rich text data, in a legacy storage system, per step 607.

Figure 7:
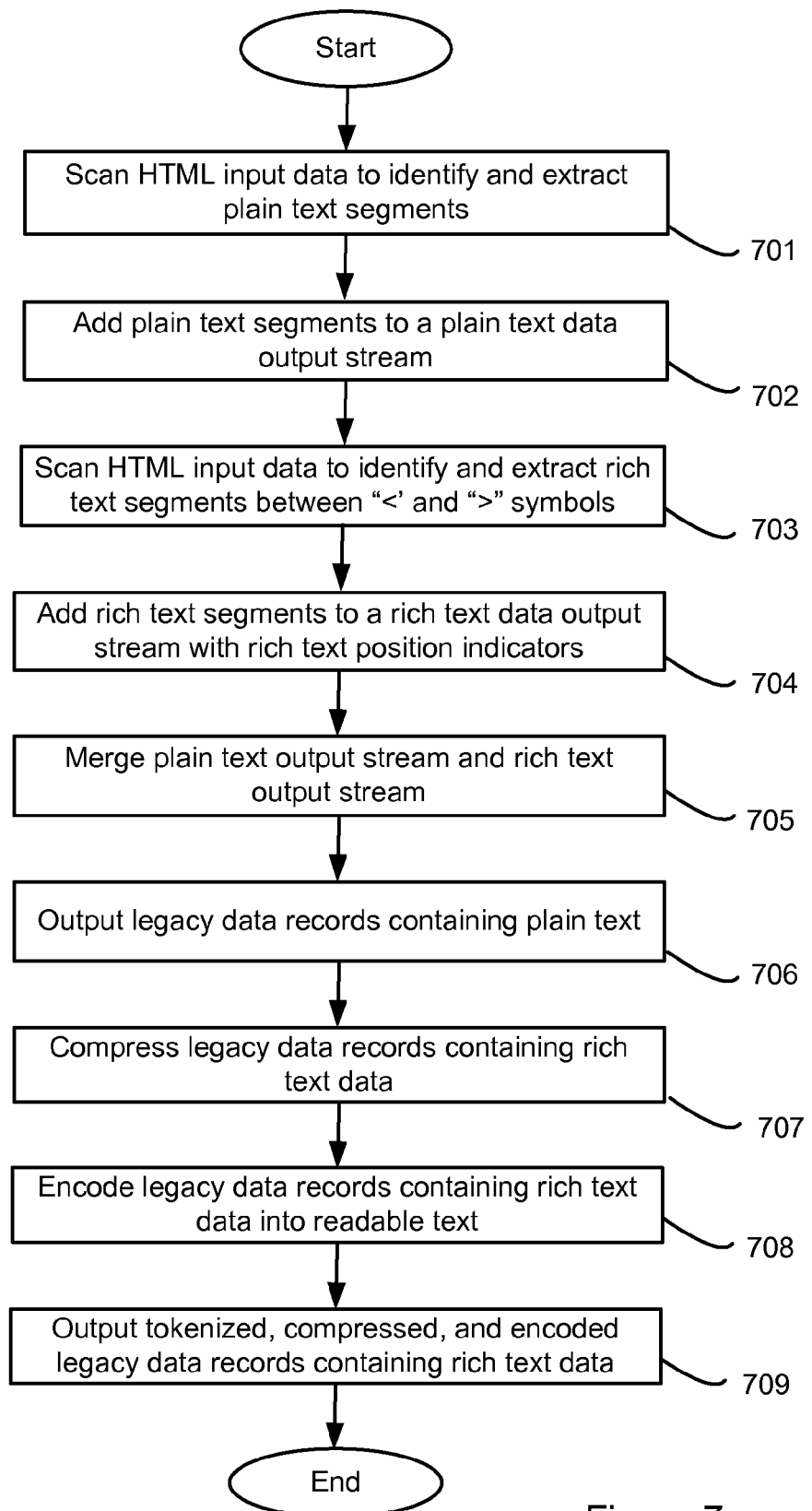
FIG. 7 is a flowchart illustrating further details of a process for extracting plain text and rich text attributes from HTML input, generating legacy data records, and optimizing the legacy data records for storing in a legacy data system, according to an exemplary embodiment of the invention.

FIG. 7 illustrates a flowchart of an exemplary process for extracting plain text and rich text attributes from rich text data in the HTML format, and optimizing the rich text attribute records for storing in a legacy data repository, according to an embodiment of the invention. A rich text processor 507 may starts at step 701 of the process to scan a rich text input for plain text segments in the input text. The identified plain text segments are added to a plain text data output stream at step 702. The rich text processor 507 may further scan the rich text input data for rich text segments at step 703. In the HTML language, rich data are delimited by the "<" and ">" symbols. For example, the input text <b>car</b> indicates that the word "car" is in boldface when rendered, and the text <i>truck</i> indicates that the word "truck" is italicized when rendered. The identified rich text segments are added to a rich text data output stream at step 704. The rich text processor 507 may merge the plain text output stream and rich text output stream at step 705, and output the merged stream as legacy data records, for example by a record generator 512. The record generator 512 may output the plain text portion of the rich text input as one or more legacy data records, at step 706.

The process illustrated in FIG. 7 may further optimize the rich text portion of the rich text input before it is output as legacy records. For example, at step 707, the rich text data optimizer 513 may compress the legacy data records containing the rich text data to reduce their size, using a Lempel-Ziv compression. The rich text data optimizer 513 may further encode the compressed records into a readable text format so that the records could be easily recognized by a user, at step 708. The process may add a unique token to the beginning of each compressed and encoded legacy record to identify it as a rich text attribute record, and output the tokenized records at step 709. The output legacy records containing the plain text and rich text attributes of the input data may now be stored in a legacy database.

FIG. 8 illustrates an example of the processing of rich text data by the rich text processor 507 to generate legacy data records to be stored in a legacy data repository. The rich text processor 507 may receive a page of rich text data 801 from a Web browser to be saved in a legacy data repository 408. As an example, the rich text data 801 may include the word "weather" in an italic font, the word "cold" in boldface, and the word "rainy" in red text. The plain text extractor 510 of the rich text processor 507 may analyze the rich text data 801 to identify and extract plain text from input data 801 as described above with reference to FIGS. 5-7. The record generator 512 may generate a legacy data record 802 that includes the plain text portion of the rich text data 801, as shown.

In addition, the rich text attribute extractor 511 of the rich text processor 507 may analyze the rich text input data 801 to identify and extract rich text attributes from the input data, which include the word "weather' in itatic, the word "cold" in boldface, and red text for the word "rainy". The record generator 512 may generate a data record 803 that includes these rich text attributes. The rich text processor 507 may be compress, encode, and prefix the rich text attribute record 803 with a token, e.g., "ICSW$", as described with reference to FIGS. 5-7.

Figure 9:
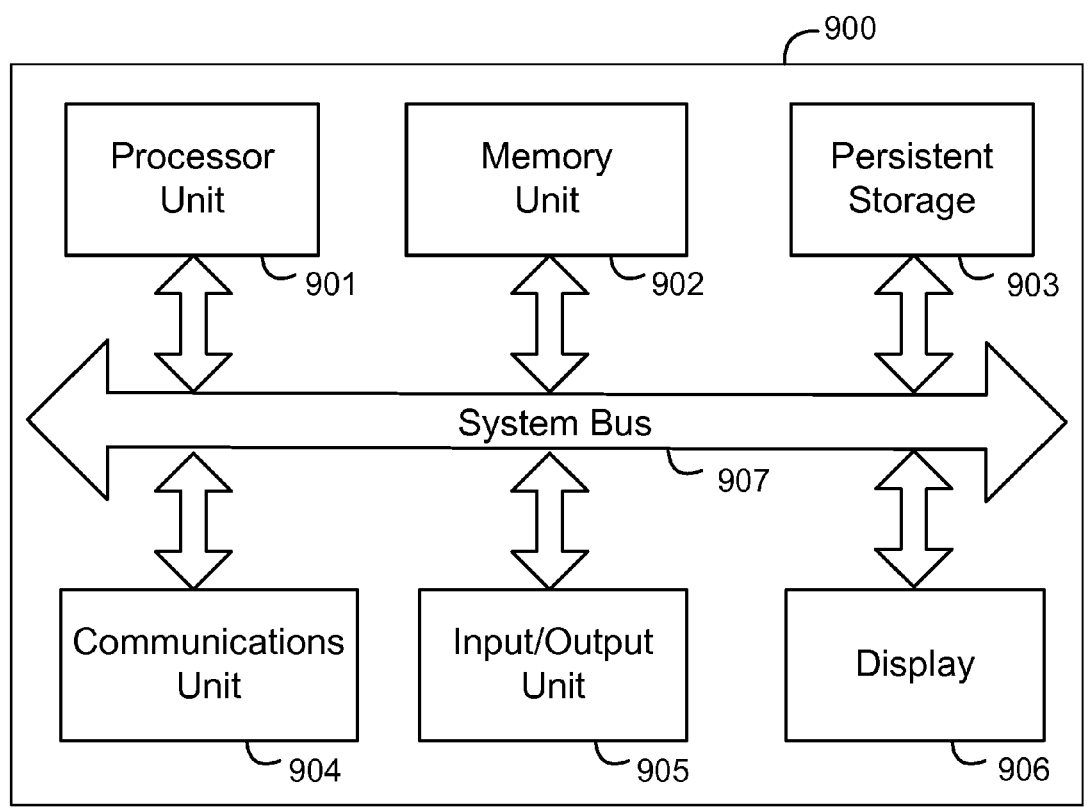
FIG. 9 is a block diagram of functional components in a computer system in which embodiments of the invention may be implemented, according to an exemplary embodiment of the invention.

FIG. 9 illustrates a block diagram of a computer is illustrated in accordance with an exemplary embodiment of the invention. Computer 900 may include a processor 901, a memory 902, a persistent storage 903, a communications unit 904, an input/output unit 905, a display 906, and system bus 907. As an example, processor unit 901 may comprise one or more processing cores and computer memory 902 may comprise EEPROM memory modules. Communications unit 904 may include network interface adapters, modems and support software. Input/output unit 905 may include a keyboard, mouse, and printer. Persistent storage 903 may comprise a hard disk drive or an optical disk drive.

Computer programs are typically stored in persistent storage 903 until they are needed for execution, at which time the programs are brought into memory unit 902 so that they can be directly accessed by processor unit 901. Processor 901 selects a part of memory 902 to read or write based on an address in memory 902 provided along with a read or write request. Usually, the reading and interpretation of an encoded instruction at an address causes processor 901 to fetch a subsequent instruction, either at a subsequent address or some other address.

An operating system runs on processor unit 901 to coordinate and control various components within computer 900 and to perform system tasks required by applications running on the computer 900. The operating system may be a commercially available or open source operating system, as are well known in the art.

Instructions for the operating system and applications or programs may be stored are located on storage devices, such as a hard disk drive 903. These instructions and may be loaded into main memory 902 for execution by processor 901. The processes of the illustrative embodiments may be performed by processor 901 using computer implemented instructions, which may be located in memory 902. Some of the processes may read from or write data to a data storage device such as hard disk drive 903.

The system components shown in FIG. 9 can be varied from the illustrative examples shown. In some illustrative examples, computer system 900 may be a personal digital assistant (PDA) configured with flash memory to provide a non-volatile memory for storing operating system files and/or user-generated data. Additionally, computer system 900 can be a tablet computer, laptop computer, or a computer-embedded communication device.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for processing rich text data, comprising:
   identifying plain text and rich text attributes from the rich text data, wherein the rich text attributes specify richness features of the plain text;
   generating a first legacy data record comprising the plain text;
   generating a second legacy data record comprising the rich text attributes;
   compressing the second legacy data record; and
   storing the first legacy data record and the compressed second legacy data record in a legacy data repository of a data storage system,
   wherein the compressed second legacy data record is prefixed by a token, wherein the token includes a unique string of characters recognizable by a user and by an application capable of applying the rich text attributes to the plain text to present the rich text data, and
   wherein the first legacy data record is separate from the second legacy data record so that the plain text appears without rich text, the plain text appearing in one or more plain text lines and the rich text appearing in one or more rich text lines prefixed by the token.

2. The method of claim 1, wherein the second legacy data record is stored inline with the first legacy data record in a legacy data storage system.

3. The method of claim 1, further comprising encoding the compressed second legacy data record in a readable text format.

4. The method of claim 1, wherein the application processes the second legacy data record to apply the rich text attributes to the plain text when presenting the rich text data.

5. The method of claim 1, wherein in response to an application incapable of applying the rich text attributes to the plain text and not recognizing the token while processing the legacy data records, the application ignores the second legacy data record.

6. The method of claim 1, further comprising encapsulating a portion of the rich text data with a marker designating a richness attribute to be applied to the portion.

7. The method of claim 1, wherein if the richness features of the rich text data are encoded in the plain text, then the second legacy data record is not generated.

8. The method of claim 1, wherein the richness features of the rich text data comprise at least one of text font, text size, text color, text style, and emphasis characteristics.

9. The method of claim 1, further comprising: extracting the plain text and the rich text attributes from the rich text data.

10. The method of claim 1, further comprising:
adding each segment of plain text to a plain text output stream; and
adding each rich text segment to a rich text stream with an indicator specifying at what point of the plain text stream the rich text segment should be inserted by adding a numeric character position after first symbol of each rich text segment.

11. The method of claim 10, further comprising:
merging the plain text stream and the rich text stream; and
outputting the merged data as records.

12. A computer readable hardware storage device medium storing computer program code for storing rich text data, the program code comprising:
program code configured to identify plain text and rich text attributes from the rich text data, wherein the rich text attributes specify richness features of the plain text; program code configured to generate a first legacy data record;
program code configured to generate a second legacy data record;
program code configured to compress the second legacy data record; and
program code configure to store the first legacy data record and the compressed second legacy data record in a legacy data repository of a data storage system,
wherein the compressed second legacy data record is prefixed by a token, wherein the token includes a unique string of characters recognizable by a user and by an application capable of applying the rich text attributes to the plain text to present the rich text data, and
wherein the first legacy data record is separate from the second legacy data record so that the plain text appears without rich text, the plain text appearing in one or more plain text lines and the rich text appearing in one or more rich text lines prefixed by the token.

13. The computer program product of claim 12, further comprising program code configured to store the second legacy data record inline with the first legacy data record in a legacy data storage system.

14. The computer program product of claim 12, further comprising program code configured to encode the compressed second legacy data record in a readable text format.

15. The computer program product of claim 12, wherein the application processes the second legacy data record to apply the rich text attributes to the plain text when presenting the rich text data.

16. The computer program product of claim 12, further comprising:
program code configured to extract the plain text and the rich text attributes from the rich text data.

17. A system for storing rich text data, comprising:
a processor;
a plain text component operable by the processor to identify plain text in the rich text data and store the plain text in a first legacy data record;
a rich text attribute component operable by the processor to identify rich text attributes in the rich text data and generate a second legacy data record which comprises the rich text attributes, wherein the rich text attributes specify richness features of the plain text, and the second legacy data record is prefixed by a token which includes a unique string of characters recognizable by a user and by an application capable of applying the rich text attributes to the plain text to present the rich text data;
a record compressing component operable by the processor to compress the second data record, and
a record storing component operable by the processor to store the second legacy data record inline with the first legacy data record in a legacy data repository of a data storage system,
wherein the first legacy data record is separate from the second legacy data record so that the plain text appears without rich text, the plain text appearing in one or more plain text lines and the rich text appearing in one or more rich text lines prefixed by the token.

18. The system of claim 17, further comprising an encoder to encode the compressed second legacy data record in a readable text format.

19. The system of claim 17, wherein in response to an application incapable of applying the rich text attributes to the plain text and not recognizing the token while processing the legacy data records, the application ignores the second legacy data record.

20. The system of claim 17, further comprising an encapsulating component operable by the processor to encapsulate a portion of the rich text data with a marker designating a richness attribute applicable to the portion.

21. The system of claim 17, wherein the richness features of the rich text data comprise at least one of text font, text size, text color, text style, and emphasis characteristics.

22. The system of claim 17, further comprising: a plain text extractor and a rich text attribute extractor operable by the processor to extract the plain text and the rich text attributes from the rich text data.

* * * * *